United States Patent [19]
Marcusen

[11] Patent Number: 5,171,061
[45] Date of Patent: Dec. 15, 1992

[54] PULL-OUT GEAR DRIVEN CONTAINER HOLDER

[75] Inventor: David P. Marcusen, Fennville, Mich.

[73] Assignee: Prince Corporation, Holland, Mich.

[21] Appl. No.: 672,465

[22] Filed: Mar. 20, 1991

Related U.S. Application Data

[63] Continuation-in-part of Ser. No. 583,666, Sep. 27, 1990, Pat. No. 5,072,989.

[51] Int. Cl.$^5$ .............................................. A47C 7/62
[52] U.S. Cl. ................................. 297/194; 248/311.2
[58] Field of Search ............... 297/194, 188; 296/37.8, 296/37.5; 248/311.2, 313

[56] References Cited

U.S. PATENT DOCUMENTS

| | | |
|---|---|---|
| 2,903,225 | 9/1959 | Weinstein . |
| 3,497,076 | 2/1970 | O'Brien .................. 211/1.3 |
| 4,040,659 | 8/1977 | Arnold .................. 297/194 |
| 4,417,764 | 11/1983 | Marcus et al. .................. 297/194 |
| 4,733,908 | 3/1988 | Dykstra et al. .................. 297/194 |
| 4,756,572 | 7/1988 | Dykstra et al. .................. 297/194 |
| 4,759,584 | 7/1988 | Dykstra et al. .................. 297/194 |
| 4,792,184 | 12/1988 | Lindberg et al. .................. 297/194 |
| 4,818,017 | 4/1989 | Dykstra et al. .................. 297/194 |
| 4,943,111 | 7/1990 | VanderLaan .................. 297/194 |
| 4,953,771 | 9/1990 | Fischer et al. .................. 108/44 |
| 4,981,277 | 1/1991 | Elwell .................. 248/281 |
| 5,007,610 | 4/1991 | Christiansen et al. .......... 248/311.2 |
| 5,096,152 | 3/1992 | Christiansen et al. .......... 297/194 |
| 5,104,184 | 4/1992 | Fisher et al. .................. 297/194 |
| 5,104,185 | 4/1992 | Fisher et al. .................. 297/194 |
| 5,104,186 | 4/1992 | Fisher et al. .................. 297/194 |
| 5,104,187 | 4/1992 | Fisher et al. .................. 297/194 |

Primary Examiner—Kenneth J. Dorner
Assistant Examiner—Cassandra Hope
Attorney, Agent, or Firm—Price, Heneveld, Cooper, DeWitt & Litton

[57] ABSTRACT

A container holder for a vehicle includes a frame slideably mounted within a hollow housing. The frame includes C-shaped recesses along its sides which cooperate with curved arms which are slideably positioned adjacent the recesses and extend to form a ring-shaped structure for holding containers when the frame is extended. The arms rotate between a storage position and a use position as the frame is moved from the retracted stored position to an extended use position respectively by the coupling of a center fixed rack and pinion gears which engage teeth on the arms.

13 Claims, 2 Drawing Sheets

PULL-OUT GEAR DRIVEN CONTAINER HOLDER

This is a continuation-in-part of application Ser. No. 583,666, now U.S. Pat. No. 5,072,989, issued Dec. 17, 1991 filed Sep. 27, 1990 and entitled, PIVOTED ARM CUPHOLDER the disclosure of which is incorporated herein by reference.

BACKGROUND OF THE INVENTION

The present invention relates to a cupholder for use in motor vehicles, and particularly to one which is slideable to a compact storage position.

Today's consumers demand that the interior of vehicles be both functional and aesthetically pleasing. One way of satisfying this need has been to provide convenience accessories such as cupholders which move between use and storage positions. However, as vehicles become smaller, the availability of storage locations of adequate size has become more limited. At the same time, optimum placement of components, such as cupholders, have become increasingly difficult due to the compact size of the passenger compartment. Thus there is a need for cupholders which compactly fold for storage and which open to provide secure retention of containers and at the same time are relatively inexpensive and reliable.

SUMMARY OF THE INVENTION

A container holder embodying the present invention comprises a frame which slides into and out of a slot in a housing. The frame includes one or more C-shaped arm means for engaging the sidewalls of a container and drive means extend between the frame and said arm means for extending the arm means in an arcuate path for use and withdrawing said arm means for storage as said frame is moved into said housing. Bail means extend under the central container receiving opening defined by said arm means for supporting the bottom of a container placed in said container holder during use.

In a preferred embodiment, the means for extending said arm means includes gear means extending between said arm means, said frame and said housing for extending said arm means as said frame is withdrawn from said housing. Thus, a container holder of the present invention provides in a preferred embodiment, a compact system with container supporting members which are positively moved as the container holder is moved from a storage position to a use position. These and other objects, features and advantages of the present invention will become apparant upon reading the following description of the invention together with reference to the accompanying drawings in which:

DETAILED DESCRIPTION OF THE PREFERRED EMBODIMENT

Figure 1:
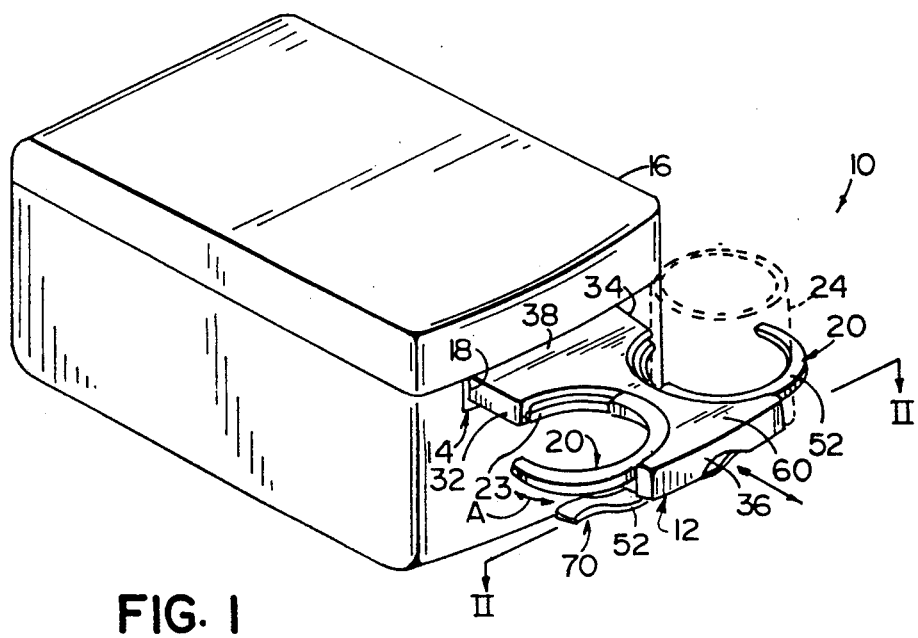
FIG. 1 is a perspective view of a vehicle armrest including a container holder embodying the present invention and shown in an extended use position.
Figure 2:
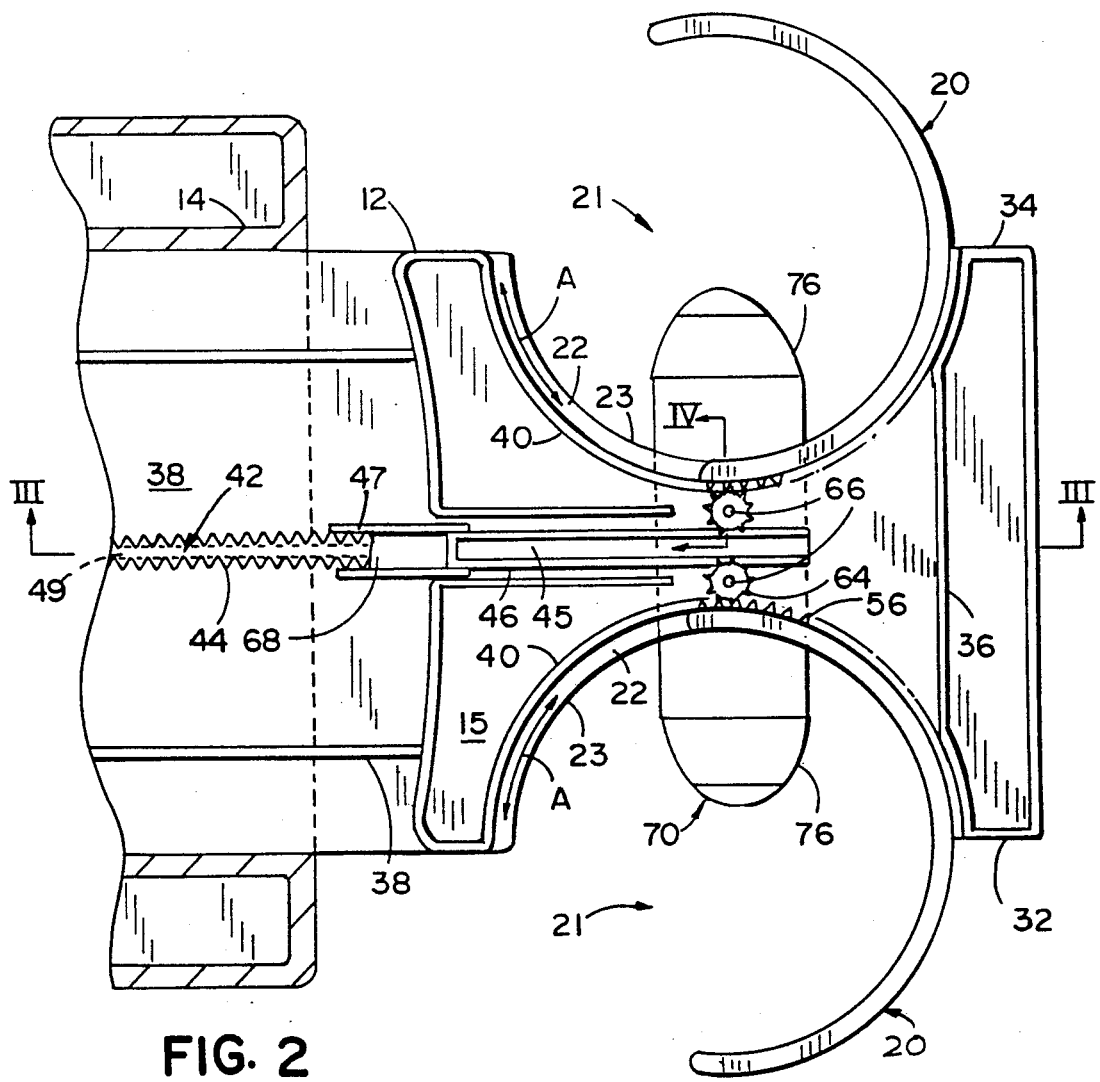
FIG. 2 is an enlarged fragmentary cross-sectional view of the container holder taken through section line II—II of FIG. 1.
Figure 3:
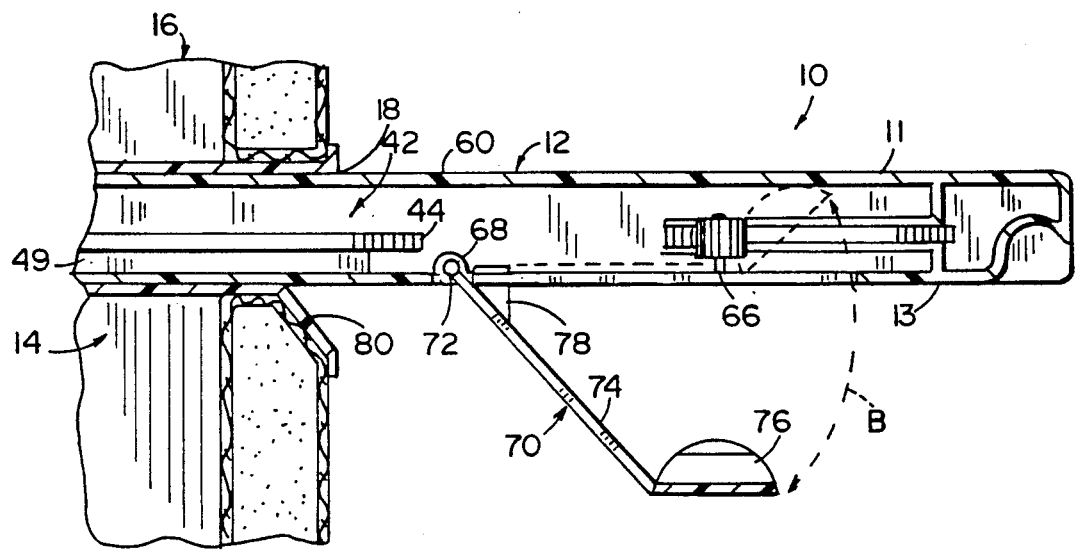
FIG. 3 is a cross-sectional view of the container holder taken through line III—III of FIG. 2.

A container holder 10 embodying the present invention is illustrated in FIGS. 1-3 and is mounted to a suitable support structure 16 in a vehicle such as an automobile. Cupholder 10 includes a frame 12 which is slideably mounted within a housing 14 of a center armrest 16 which includes a forwardly facing slot 18. Frame 12 slides between an extended use position shown in FIG. 1 and a retracted storage position within housing 14 of armrest 16. A pair of generally C-shaped arms 20 are movably supported within correspondingly C-shaped guide tracks 22 on opposite sides of frame 12 to form a generally ring-shaped structure for holding a pair of containers such as a can or cup 24 when frame 12 is in the extended use position. Arms 20 slideably retract along a path shown by arrows A in FIGS. 1 and 2 into frame 12 to form a compact arrangement for storage as frame 12 is slideably retracted into the retracted storage position within housing 14. Positive drive means mounted between frame 12, arms 20, and the housing 14 cooperate to rotate arms 20 outwardly to a use position as frame 12 is slid outwardly and rotate arms 20 inwardly toward a storage position as frame 12 is slid into housing 14.

Frame 12 is a substantially planar structure of generally rectangular configuration with sides 32 and 34 but with C-shaped recesses or guides 22 integrally formed on either side 32 and 34. Frame 12 includes a finger grip 36 at its forward edge and includes a rearwardly extending center support 38 which provides structural support for frame 112 when frame 12 is fully extended. Support 38 cooperatingly slides within slot 18 of housing 14 to provide a smooth, non-binding sliding action. Located around the perimeter of recesses 22 is a curved track or ridge 40 (FIG. 2) which cooperates to guide arms 20 as discussed below.

Mounted within housing 14 is an elongated member 42 centrally positioned within slot 18 and extending parallel to the direction of movement of frame 12. Member 42 includes teeth 44 on either side along its length, the purpose of which is described below. Two ribs 46 extend along support 38 adjacent and on either side of member 42 and serve to guide and stabilize frame 12 as it translates fore and aft.

Figure 4:
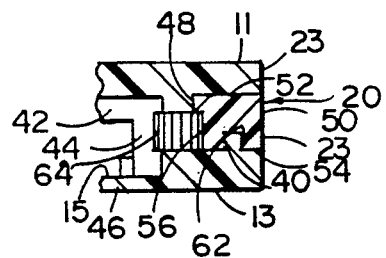
FIG. 4 is an enlarged cross-sectional view taken through section line IV—IV of FIG. 3.

Arms 20 are C-shaped and are slideably positioned on frame 12 within recesses 22 with one arm 20 adjacent each recess 22. Arms 20 slide on tracks 40 around recesses 22 between the rotated use position and retracted storage position. Arms 20 each include a generally rectangular cross-section defined by an inner surface 48, an outer surface 50, a top surface 52 and a bottom surface 54, as best seen in FIG. 4. Inner surface 48 integrally includes gear teeth 56 extending along its length for the controlled movement of the arms as described below. Outer surface 50 provides a container engaging surface along with surface 23 of recess 22. Top surface 52 is flush with, and provides an aesthetically pleasing matching surface with upper surface 60 of frame 12 (FIG. 1). Bottom surface 54 includes an upwardly extending notch 62 which extends over and rides on track 40 of frame 12. In the preferred embodiment, the cross-section is substantially rectangular, although it is contemplated that alternative cross-sectional shapes are possible The means for extending and retracting arms 20 include the gear teeth 56 on the vertical edge of the arms which engage a pinion gear 64 rotatably mounted to the frame between the upper frame member 11 and the lower frame member 3. In the preferred embodiment, two pinion gears 64 are mounted for rotational movement about a vertical axis adjacent recesses 22 and positioned to engage the teeth 44 on either side of elongated member 42 as frame 12 is moved between the extended use position and the retracted storage position. Pinion gears 64 also operably engage the teeth 56 on arms 20 such that as the frame 12 is withdrawn the gears 64 rotate against the stationary rack 42 causing the arms to extend. In the embodiment shown, each pinion gear 64 is mounted on vertical pins 66 (FIG. 2). The rack 42, as best seen in the half view of FIG. 4, is generally inverted U-shaped with guide rails 46 extending upwardly from the floor 15 of lower frame half 13 for guideably engaging the inner surface of the rack 42. Outer guide rails 47 also provide controlled and stable motion to the frame in its motion with respect to the rack which is mounted on a support floor 49 (FIG. 3) of housing 14. A slot 45 in floor 15 of lower frame half 13 provides clearence for member 49.

In order to support the bottom of a container, a pivoted generally T-shaped bail 70 is pivotally mounted to the lower frame half 13 as seen in Figs. 1–3. Bail 70 includes a cross arm 76 extending at least partially under the openings 21 for receiving containers as seen in FIG. 2. Cross arm 76 is integral with center leg 74 which is pivotally mounted by a hinge pin 72 to hinge mounting boss 68 on frame 12 (FIG. 3). When frame 12 is in the extended use position, leg 74 extends diagonally downwardly from the lower frame half 13 and side members 76 extend laterally under the cupholder rings formed by arms 20 and is supported in this diagonal position by upstanding catch 78 which engages frame 12 for holding bail 70 diagonally in a lowered use position. As frame 12 is moved from an extended position into the retracted position, leg 74 contacts lower lip 80 of slot 18 thus forcing leg 74 and therefore bail 70 upwardly around hinge point 72. Bail 70 thus is raised upwardly and folds flush into frame 12 as shown by arrow B in FIG. 3.

OPERATION

Having described the components of the container holder of the present invention, the operation of the present invention is as follows. Initially, frame 12 and arms 20 are assembled and secured within housing 14 which is, in turn, securely attached within a vehicle such as within an armrest 16. When an operator desires to use the container holder 10, the operator grips finger grip 36 pulling frame 12 outwardly from slot 18. As frame 12 is extended, center gear rack 42 rotates pinion 66 and causes arms 20 to rotationally extend around recesses 22 guided on curved tracks 40 integrally formed on bottom frame half 13. When frame 12 is about halfway extended, arms 20 are fully extended forming a substantially ring-like structure for holding one or two containers 24. Simultaneously, bail 70 gravity drops downwardly as hinge point 72 slides past the front of slot 18, into a container supporting position below arms 20 and openings 21 formed thereby. Frame 12 is then fully extended to a use position wherein the rack 42 is disengaged from gears 66 as seen in FIG. 2 until the frame is again pushed rearwardly.

When the operator is done using cupholder 10, the operator merely pushes frame 12 back into slot 18 within housing 14. As frame 12 is moved rearwardly, central member 74 of center support 70 strikes lip 80 and is forced upwardly into a storage position within frame 12. Also, rack 42, again engages pinions 66 and causes arms 20 to rotate into storage positions within the confines of the edges 32 and 34 of frame 12 as frame 12 slides within slot 18.

Thus, as can be seen, the cupholder of the present invention provides a unique assembly which slides into compact arrangement for storage and which opens into a cup supporting structure which is larger than the slot from which it is housed. The positive gear drive mechanism assures the desired controlled movement of the arms without requiring springs or other structure which may be subject to failure. While only one embodiment of the present invention has been shown and described, modifications will become apparent to those of ordinary skill in the art and will fall within the spirit and scope of the invention as defined by the appended claims.

The embodiments of the invention in which an exclusive property or privilege is claimed are defined as follows:

1. A container holder for a vehicle comprising:
   a housing having a slot formed therein;
   a frame having sides forming at least one C-shaped recess defining a portion of a structure for receiving a container, said frame slideably mounted in said slot and moveable between an extended use position and a retracted storage position within said housing, said frame further including guide means disposed adjacent each C-shaped recess and having a curvature defining an arcuate path along said C-shaped recess;
   at least one curved C-shaped arm positioned adjacent said C-shaped recess, said arm having a curvature corresponding to said curvature of said arcuate path and slideably mounted in said guide means for rotation along said arcuate path between a use position wherein said arm cooperates with said C-shaped recess to form said structure for holding a container and a storage position wherein said arm and said frame are compactly stored within said housing; and
   means extending between said frame and said arm for extending said arm between said use and stored positions as said frame is moved between an extended use position and a retracted storage position respectively.

2. The apparatus as defined in claim 1 and further including means for directing the movement of said frame between an extended use position and a retracted storage position in said housing.

3. The apparatus as defined in claim 2 and further including a bail pivotally attached to said frame to drop downwardly to support the bottom of a container when said frame is moved to an extended use position and which pivots upwardly adjacent said frame when said frame is moved to the retracted storage position.

4. A container holder for a vehicle comprising:
   a housing having a slot formed therein;
   a frame having sides forming at least one C-shaped recess defining a structure for receiving a container, said frame slideably mounted in said slot and moveable between an extended use position and a retracted storage position within said housing, said frame further including guide means disposed adjacent each C-shaped recess defining an arcuate path around said C-shaped recess and an apparent axis of rotation within said C-shaped recess;

at least one curved arm positioned adjacent said C-shaped recess and slideably mounted to said guide means for rotation along said arcuate path between a use position wherein said arm cooperates with said C-shaped recess to form said structure for holding a container and a storage position wherein said arm and said frame are compactly stored within said housing;

means extending between said frame and said arm for extending said arm between said use and stored positions as said frame is moved between an extended use position and a retracted storage position respectively;

means for directing the movement of said frame between an extended use position and a retracted storage position in said housing;

a bail pivotally attached to said frame to drop downwardly to support the bottom of a container when said frame is moved to an extended use position and which pivots upwardly adjacent said frame when said frame is moved to the retracted storage position; and said means for guiding said frame including a center rack.

5. The apparatus as defined in claim 4 wherein said means for extending said arm cooperates with said rack.

6. The apparatus as defined in claim 5 wherein said arm includes gear means and wherein said means for extending said arm includes a pinion gear rotatably mounted to said frame to operatively couple said gear means of said arm and said rack such that said arm is extended to a use position when said frame is withdrawn to an extended use position.

7. The apparatus as defined in claim 6 wherein said arm is C-shaped.

8. The apparatus as defined in claim 7 wherein said guide means comprise ridge means which extends around said C-shaped recess and wherein said arm includes a recess which extends over said ridge means.

9. A container holder for a vehicle comprising:
a frame with a pair of spaced curved edges, said frame adapted to be slideably positioned in a vehicle and extendable between and extended use position and retracted storage position, said frame including track means adjacent said curved edges, said track means defining an arcuate path;

curved arm means slideably positioned on said track means and moveable along said arcuate path between an extended use position and a retracted storage position wherein said edges and said arms cooperate to form a ring-like structure for holding containers; and means for moving said arms and frame simultaneously between an extended use position and a retracted storage position.

10. The apparatus as defined in claim 9 including a bail pivotally attached to said frame which drops downwardly to support the bottom of a container when said frame is moved to an extended use position and which pivots upwardly adjacent said frame when said frame is moved to a retracted storage position.

11. A container holder for a vehicle comprising:
a housing adapted to be mounted to a vehicle and including a slot for access to a recess within said housing;

a frame which is slideably mounted and slides into and out of said housing; and at least one C-shaped arm including means for engaging a sidewall of a container and drive means extending between said frame and said arm means for extending the arm means in an arcuate path for use, and withdrawing said arm means for storage as said frame is moved into said housing.

12. The apparatus as defined in claim 11 wherein said at least one arm defines a container receiving opening when said at least one arm is extended for use, and further including bail means extending under the container receiving opening defined by said arm means for supporting the bottom of a container placed in said container holder opening during use.

13. The apparatus as defined in claim 12 wherein said means for extending said arm means includes gear means extending between said arm means, said frame and said housing for extending said arm means as said frame is withdrawn from said housing.

* * * * *